(12) United States Patent
Zhou

(10) Patent No.: US 10,203,047 B2
(45) Date of Patent: Feb. 12, 2019

(54) BALANCED VALVE ELEMENT AND PRESSURE REGULATING VALVE

(71) Applicant: FISHER JEON GAS EQUIPMENT (CHENGDU) CO., LTD., Chengdu, Sichuan (CN)

(72) Inventor: Biao Zhou, Sichuan (CN)

(73) Assignee: FISHER JEON GAS EQUIPMENT (CHENGDU) CO., LTD., Chengdu (CN)

( * ) Notice: Subject to any disclaimer, the term of this patent is extended or adjusted under 35 U.S.C. 154(b) by 69 days.

(21) Appl. No.: 15/328,409

(22) PCT Filed: Jul. 22, 2015

(86) PCT No.: PCT/CN2015/084848
§ 371 (c)(1),
(2) Date: Jan. 23, 2017

(87) PCT Pub. No.: WO2016/011951
PCT Pub. Date: Jan. 28, 2016

(65) Prior Publication Data
US 2017/0211720 A1    Jul. 27, 2017

(30) Foreign Application Priority Data

Jul. 22, 2014 (CN) .......................... 2014 1 0372723
Jul. 22, 2014 (CN) ..................... 2014 2 0426115 U

(51) Int. Cl.
*F16K 31/12* (2006.01)
*F16K 31/126* (2006.01)
(Continued)

(52) U.S. Cl.
CPC .......... *F16K 31/1262* (2013.01); *F16K 1/126* (2013.01); *F16K 1/36* (2013.01);
(Continued)

(58) Field of Classification Search
CPC ............ G05D 16/0636; G05D 16/0655; F16K 31/1262; F16K 1/36; F16K 39/022
See application file for complete search history.

(56) References Cited

U.S. PATENT DOCUMENTS 3,743,237 A * 7/1973 Kiser .................. F16K 31/1262
                                                         251/25
4,469,124 A * 9/1984 Bronsky ............. F16K 31/1262
                                                         137/464

(Continued)

FOREIGN PATENT DOCUMENTS

| CN | 2530117 Y | 1/2003 |
| CN | 2789520 Y | 6/2006 |

(Continued)

OTHER PUBLICATIONS

Extended European Search Report for EP 15825096.9, dated Feb. 5, 2018.

(Continued)

*Primary Examiner* — P. Macade Nichols
(74) *Attorney, Agent, or Firm* — Marshall, Gerstein & Borun LLP

(57) ABSTRACT

A balancing valve spool and a pressure regulating valve including the balancing valve spool. The balancing valve spool includes a valve rod having a first end and a second end. The valve rod defines a longitudinal axis that extends between the first end and the second end. The balancing valve spool also includes a piston sleeve fixed to the valve rod between the first end and the second end. The balancing spool valve further includes a fixing member arranged between the valve rod and the piston sleeve. The fixing member extends in a direction parallel to the longitudinal axis of the valve rod. Connecting the fixing piece to an actuator of the valve and arranging the fixing piece between the valve rod and the piston sleeve along the axial direction (Continued)

of the valve rod, guides the valve rod and simultaneously isolates inlet pressure and outlet pressure.

20 Claims, 4 Drawing Sheets

(51) Int. Cl.
*F16K 1/36* (2006.01)
*F16K 1/12* (2006.01)
*G05D 16/06* (2006.01)
*F16K 39/02* (2006.01)
*G05D 16/02* (2006.01)

(52) U.S. Cl.
CPC ........... *F16K 39/022* (2013.01); *G05D 16/02* (2013.01); *G05D 16/0636* (2013.01); *G05D 16/0655* (2013.01)

(56) References Cited

U.S. PATENT DOCUMENTS

| 4,721,284 A | * | 1/1988 | Bankard | ............ F16K 1/54 |
| | | | | 251/122 |
| 2010/0035117 A1 | * | 2/2010 | Takeshita | ............ F16K 31/1262 |
| | | | | 429/412 |

FOREIGN PATENT DOCUMENTS

| CN | 101625033 A | 1/2010 |
| CN | 202327281 U | 7/2012 |
| CN | 203656339 U | 6/2014 |
| FR | 1331025 A | 6/1963 |
| GB | 286249 A | 7/1928 |
| SU | 556224 A1 | 4/1977 |

OTHER PUBLICATIONS

International Search Report for Application No. PCT/CN2015/084848, dated Sep. 24, 2015.

* cited by examiner

BALANCED VALVE ELEMENT AND PRESSURE REGULATING VALVE

FIELD OF THE INVENTION

The present disclosure generally relates to the field of fluid control, more specifically to a balancing valve spool and, further, to a pressure regulating valve including the balancing valve spool.

BACKGROUND

In a pressure regulator, since inlet pressure acts on a valve seat to produce an additional force which directly influences the performance of a pressure regulator product, a balancing valve spool is usually employed.

FIG. 1 shows a prior art balancing valve spool. In this spool, one end of an n-shaped diaphragm 10 is fixedly connected with a valve rod and the other end of the n-shaped diaphragm is fixedly connected with a valve body or a connecting piece (for connecting the valve body with an actuator), wherein the end of the n-shaped diaphragm which is connected with the valve rod needs to be fixed on the valve rod by using a fixing piece. From FIG. 1, it can be seen that this balancing valve spool has a complex structure, with a large number of parts, resulting in relatively higher cost.

FIG. 2 is another prior art balancing valve spool. This design adopts a valve rod mobile piston structure, wherein an O-ring 20 is arranged on a piston sleeve 12 to achieve a sealing effect, isolating inlet pressure and outlet pressure. However, this kind of structure is not beneficial for guiding a valve rod 11 (since the O-ring 20 has elasticity, the valve rod 11 will shake). In addition, the smoothness of a cylindrical surface of the piston sleeve 12 in contact with the O-ring is difficult to guarantee. Further a guide sleeve 30 needs to be added to guide the valve rod 11 and additional space needs to be added in a longitudinal space of the valve in order to install the guide sleeve 30 and, thereby, the structure of the valve is more complex.

SUMMARY

In order to address the issues found in the prior art, the present disclosure provides a less complex balancing valve spool and a pressure regulating valve including the balancing valve spool.

In accordance with one exemplary aspect of the present disclosure, a balancing valve spool may include a valve rod, a piston sleeve fixed on the valve rod, and a fixing piece sleeved between the valve rod and the piston sleeve and arranged along a direction in parallel with an axis of the valve rod.

In some examples, the piston sleeve includes a sleeve body and a bottom portion, the bottom portion of the piston sleeve is fixed to the valve rod and a first gap is located between an inner wall of the sleeve body of the piston sleeve and an outer wall of the valve rod.

In some examples, a first sealing part is placed between the fixing piece and the sleeve body of the piston sleeve.

In accordance with another exemplary aspect of the present disclosure, a pressure regulating valve includes a valve body provided with a valve chamber, an actuator fixedly connected with the valve body, and a balancing valve spool. The balancing valve spool includes a valve rod, a piston sleeve fixed on the valve rod, a fixing piece arranged between the valve rod and the piston sleeve, and a valve seat fixed to the valve rod. The actuator is coupled to the valve rod to move the valve seat within the valve chamber to control fluid flow through the valve body.

In some examples, the fixing piece is fixedly connected onto the actuator.

In some examples, the actuator may include a pressure regulating device, a diaphragm cap assembly including a first diaphragm cap and a second diaphragm cap, the first diaphragm cap being connected to the pressure regulating device, the second diaphragm cap being connected to the valve body, and the first diaphragm cap and the second diaphragm cap forming a hollow internal portion, and a diaphragm assembly including a diaphragm, the diaphragm being located between the first diaphragm cap and the second diaphragm cap.

In some examples, the fixing piece is fixed to the second diaphragm cap. In some examples, the fixing piece and the second diaphragm cap are integrally molded.

In some examples, the pressure regulating valve may further include guide sleeves which are fixed to the second diaphragm cap and the guide sleeves are rings which surround a cross section of the valve rod.

In some examples, the pressure regulating valve further includes guide sleeves which are located on an outer circumference of the valve rod.

In some examples, there may be at least two guide sleeves.

In some examples, the bottom portion of the piston sleeve includes an extending portion which extends outwardly along an axial direction of the valve rod and the extending portion is fixed onto the valve rod.

In some examples, the valve rod and the piston sleeve are integrally molded.

In some examples, a second sealing part is arranged at a connection between the valve rod and the bottom portion of the piston sleeve.

By connecting the fixing piece to the actuator of the valve and arranging the fixing piece between the valve rod and the piston sleeve along the axial direction of the valve rod, the valve rod is guided and the inlet pressure and outlet pressure are simultaneously sealed, yet the design has a simple structure.

DETAILED DESCRIPTION OF THE DRAWINGS

Figure 4:
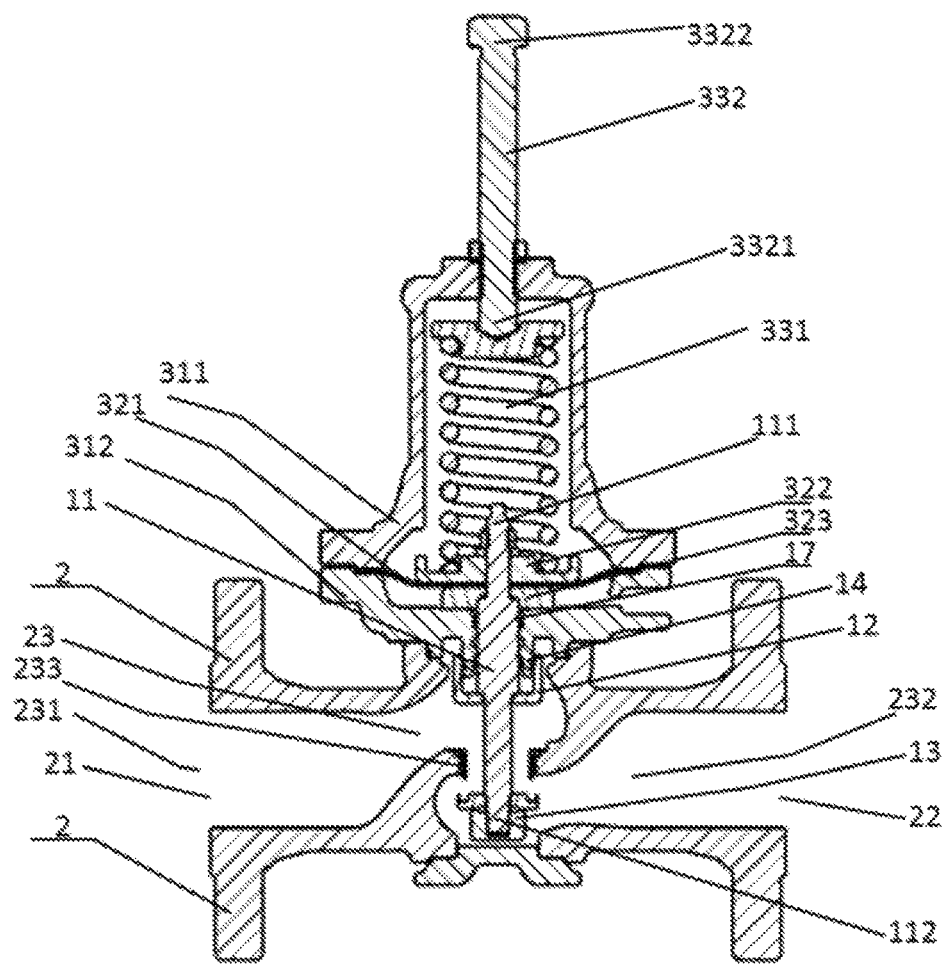
FIG. 4 is a schematic diagram of a pressure regulating valve constructed according to the teachings of the present disclosure and employing the balancing valve spool of FIG. 3.

A balancing valve spool set forth in this disclosure is located in a pressure regulating valve. As shown in FIG. 4, the pressure regulating valve includes a valve body 2, the balancing valve spool, and an actuator. The valve body 2 includes an inlet 21, an outlet 22 and a valve chamber 23. The actuator is fixedly connected to the valve body. Inlet pressure of the pressure regulating valve provided by the present disclosure may be gas pressure in one example and may also be liquid pressure in another example. Correspondingly, outlet pressure may be gas pressure in one example and may be a liquid pressure in another example.

Figure 1:
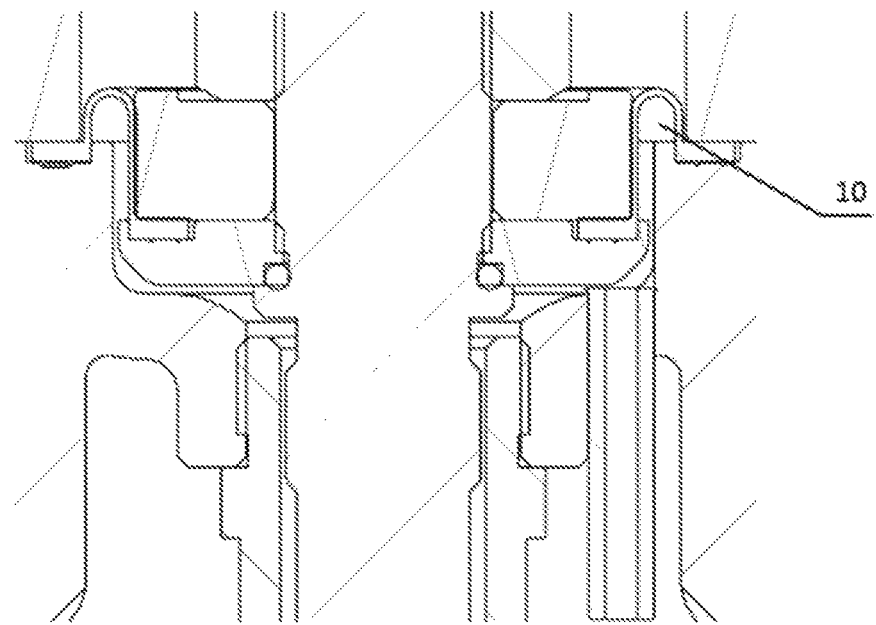
FIG. 1 is a schematic diagram of a balancing valve spool according to the prior art.
Figure 2:
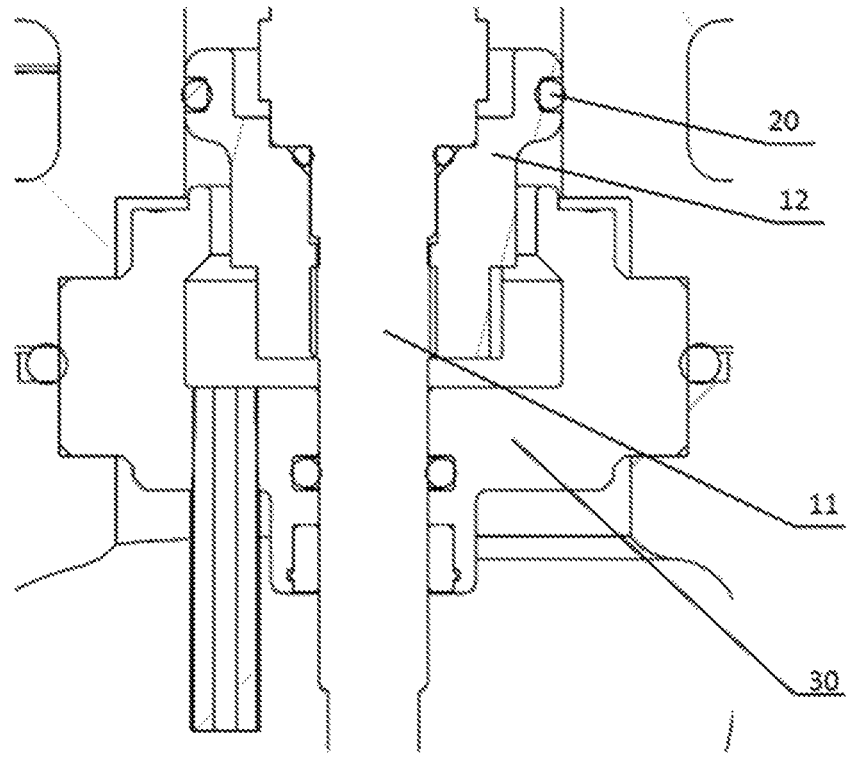
FIG. 2 is a schematic diagram of another balancing valve spool according to the prior art.
Figure 3:
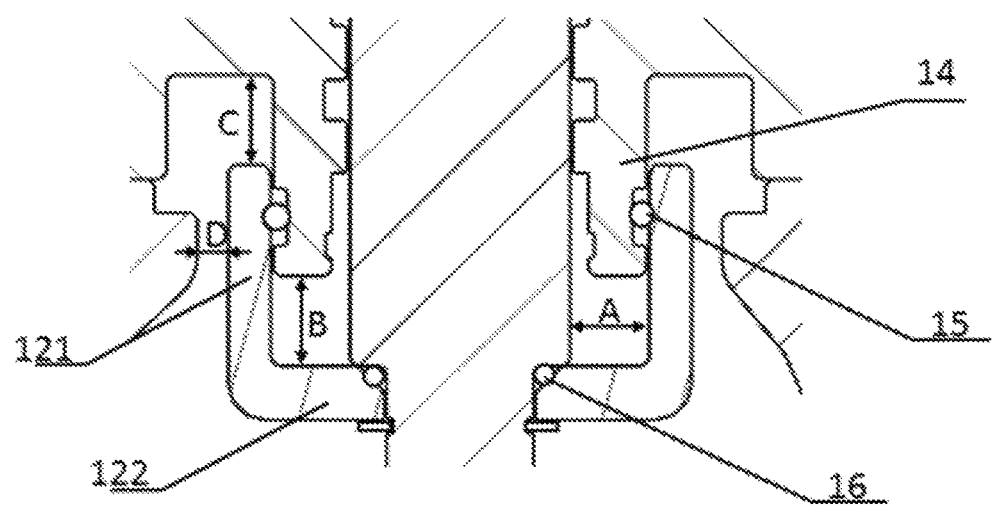
FIG. 3 is a schematic diagram of a balancing valve spool constructed according to the teachings of the present disclosure.

As shown in FIG. 3 and FIG. 4, the balancing valve spool includes a valve rod 11, a piston sleeve 12, a valve seat 13, and a fixing piece 14. The valve rod 11 includes a first end 111 and a second end 112, wherein the first end 111 of the valve rod is placed in the actuator of the valve and the second end 112 of the valve rod is fixed to the valve seat 13. The valve seat 13 is movably arranged in the valve chamber 23. The piston sleeve 12 includes a sleeve body 121 and a bottom portion 122, wherein the bottom portion 122 of the piston sleeve 12 is fixed on the valve rod 11 and a first gap A is configured between an inner wall of the sleeve body of the piston sleeve 12 and an outer wall of the valve rod 11. The fixing piece 14 is attached to the actuator of the valve and the fixing piece 14 is arranged between the valve rod 11 and the piston sleeve 12 along an axial direction of the valve rod. The valve rod 11, the piston sleeve 12 and the valve seat 13 can move along the axial direction of the valve rod.

The fixing piece 14 guides the valve rod 11 and simultaneously isolates the inlet pressure and outlet pressure. To achieve the sealing effect, in one example, a first sealing part 15 may be placed between the fixing piece 14 and the sleeve body 121 of the piston sleeve 12. The first sealing part 15 may be an O-ring and may also be sealing packing. It will be appreciated that the seal described herein is a dynamic seal as the fixing piece 14 and the piston sleeve 12 move relative to one another. Sealing the inlet pressure and the outlet pressure enables the pressure regulating valve to maintain a stable outlet pressure. If the inlet pressure and the outlet pressure are not isolated from one another, the outlet pressure will always rise. It will also be appreciated that the inlet pressure is generally higher than the outlet pressure.

To ensure the valve rod 11, the piston sleeve 12, and the valve seat 13 move along an axial direction of the valve rod, as shown in FIG. 3, in this example, a second gap B is placed between the fixing piece 14 and the bottom portion 122 of the piston sleeve, a third gap C is placed between the actuator of the pressure regulating valve and the piston sleeve 12, and a fourth gap D is placed between the valve body 2 and the piston sleeve 12.

The valve chamber 23 includes a first area 231 in communication with the inlet 21, a second area 232 in communication with the outlet 22, and a valve port 233 in communication with the first area 231 and the second area 232. When the valve rod 11 moves, the valve seat 13 moves between the valve port 233 and the second area 232.

In this example, the actuator includes a diaphragm cap assembly, a diaphragm assembly and a pressure regulating device. The diaphragm cap assembly includes a first diaphragm cap 311 and a second diaphragm cap 312, the first diaphragm cap 311 is connected to the pressure regulating device, the second diaphragm cap 312 is connected to the valve body 2, and the first diaphragm cap 311 and the second diaphragm cap 312 are coupled to one another to form a hollow internal portion. The diaphragm assembly includes a diaphragm 321, a first diaphragm plate 322 and a second diaphragm plate 323. The diaphragm 321 is pressed between the first diaphragm plate 322 and the second diaphragm plate 323 and the diaphragm 321 is located between the first diaphragm cap 311 and the second diaphragm cap 312. Further, the first diaphragm plate 322 is located within a cavity formed by the diaphragm 321 and the first diaphragm cap 311 and the second diaphragm plate 323 is located within a cavity formed by the diaphragm 321 and the second diaphragm cap 312. The pressure regulating device includes a spring 331 and a regulating rod 332. In particular, the spring 331 is located inside of the first diaphragm cap 311 and the regulating rod 332 includes a third end 3321 and a fourth end 3322. The third end 3321 of the regulating rod 332 penetrates through the first diaphragm cap 311 and is in contact with the spring 331, the fourth end 3322 of the regulating rod 332 is suspended, and the regulating rod is fixed to the first diaphragm cap 311. Further yet, the first diaphragm plate 322 supports the spring 331 and transfers spring force. The second diaphragm plate 323 isolates the outlet pressure and the exterior.

Specifically, the first end 111 of the valve rod 11 penetrates the diaphragm 321 and is fixed to the first diaphragm plate 322. The fixing piece 14 is attached to the second diaphragm cap 312. The fixing piece 14 may be integrally molded with the second diaphragm cap 312, in some examples, and may also be fixed on the second diaphragm cap 312 as an independent part, in other examples. As shown in FIG. 4, the fixing piece 14 is integrally molded with the second diaphragm cap 312. It will be appreciated that the fixing piece 14 need not be fixed on the second diaphragm cap 312. For example, the fixing piece 14 may be attached to the actuator or the fixing piece 14 may be attached to the valve body 2.

Figure 5:
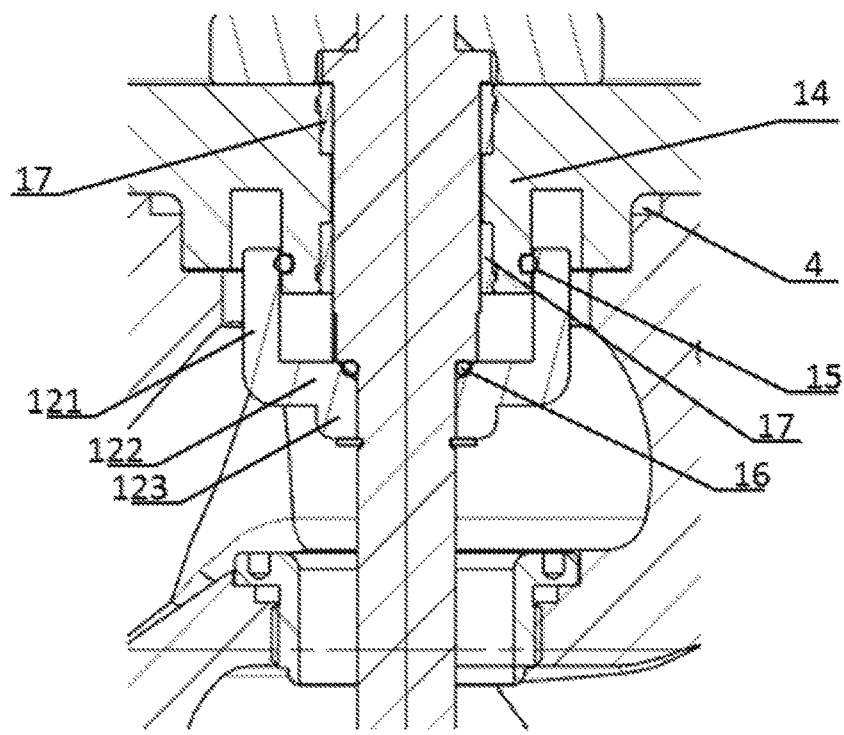
FIG. 5 is a schematic diagram of yet another example of a balancing valve spool constructed according to the teachings of the present disclosure.
Figure 6:
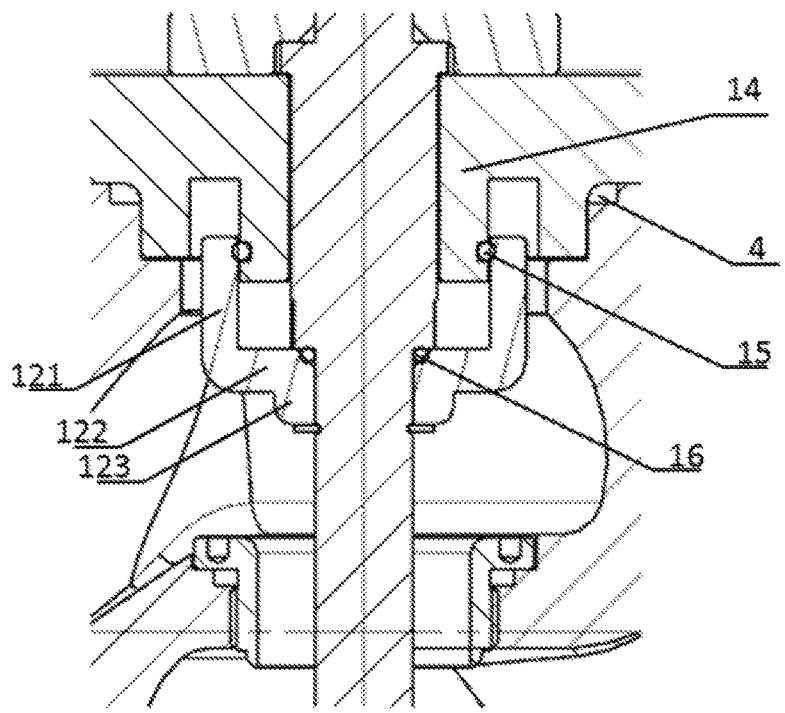
FIG. 6 is a schematic diagram of yet another example of a balancing valve spool constructed according to the teachings of the present disclosure.

To enable the valve rod 11 to be guided along a straight line, the pressure regulating valve in this example further includes guide sleeves 17 fixed to the second diaphragm cap 312. In particular, the guide sleeves 17 are rings that surround a cross section of the valve rod 11. In this example, two guide rings are utilized, as shown in FIG. 5. Of course, in other examples, one guide ring can be used or more than two guide rings can also be used. However, if a guide surface in contact with the valve rod 11 is smooth enough, there may be no guide ring. For example, FIG. 6 shows a balancing valve spool without a guide sleeve. The guide sleeves 17 can be made of brass, PTFE, etc. The guide sleeves 17 guide the valve rod 11 and also reduce friction.

Alternatively, in another example, the guide sleeves 17 may be located on an outer circumference of the valve rod 11 and are located on the outer circumference of a middle position of the valve rod, i.e., a position between the first end 111 of the valve rod and the piston sleeve 12.

Figure 7:
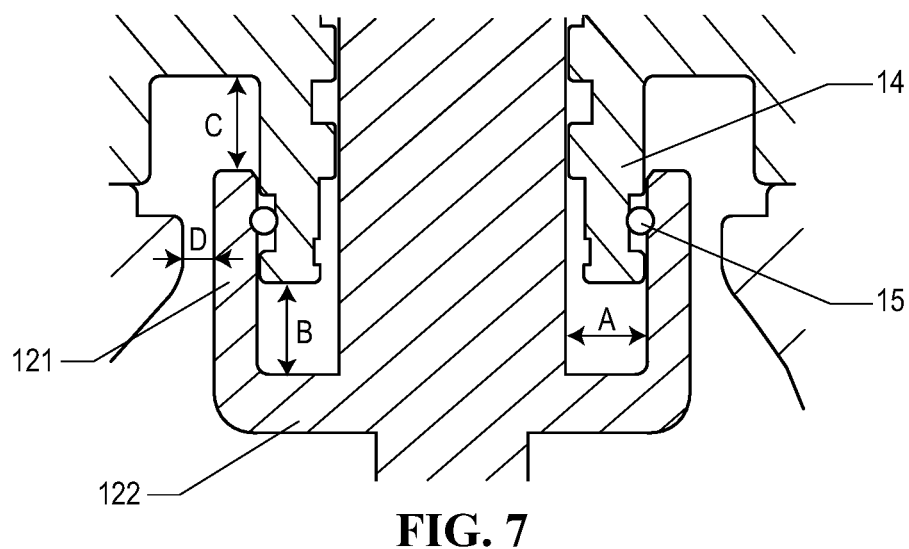
FIG. 7 is a schematic diagram of yet another example of a balancing valve spool constructed according to the teachings of the present disclosure.

During manufacturing, the valve rod 11 and the piston sleeve 12 may be two independent parts (as shown in FIG. 3) or may be integrally molded (as shown in FIG. 7). In the example in which the valve rod 11 and the piston sleeve 12 are two independent parts, to isolate the inlet pressure and the outlet pressure, a second sealing part 16 is placed at a connection between the valve rod 11 and the bottom portion 122 of the piston sleeve 12 to achieve a sealing effect. In one example, the second sealing part 16 may be an O-ring. In another example, the second sealing part 16 may be sealing packing. It will be appreciated that the seal described herein is a static seal because the fixing piece 14 and the piston sleeve 12 are relatively static. Isolating the inlet pressure and the outlet pressure enables the pressure regulating valve to maintain a stable outlet pressure. However, since the inlet pressure is higher than the outlet pressure, must be isolated or else the outlet pressure will rise.

Further, it will be appreciated that the piston sleeve 12 bears an upward balancing force to balance downward pressure produced by the gas inlet pressure (or liquid inlet pressure) to the valve seat. Therefore, other piston sleeve structures may be used and the piston sleeve structures are not limited to those shown in FIG. 3 and FIG. 4. For example, in one example, in order to facilitate manufacturing, the bottom portion 122 of the piston sleeve may also include an extending portion 123 which extends outwardly along the axial direction of the valve rod and the extending portion 123 is fixed to the valve rod 11, as shown in FIG. 5 and FIG. 6.

In the example shown in FIG. 4, the second diaphragm cap 312 of the actuator and the valve body 2 are fixedly connected through screws. In other examples, other fixed connecting means known to a person of skill in the art may be utilized. If a contact part between the second diaphragm cap 312 and the valve body 2 is not well sealed, a third sealing part 4 may be placed at the contact position to sealingly isolate medium in the valve body from the external environment. The third sealing part may be an O-ring or may be packing.

By adopting the design described herein, the structure of the pressure regulating valve (mainly the balancing valve spool) is simplified, the number of parts is reduced, the cost is reduced, and the additional space does not need to be added in the longitudinal direction for the guide sleeves of the valve rod.

During operation of the pressure regulating valve of FIG. 4, gas or liquid enters the valve through the first area from the inlet. The inlet pressure exerts a force on the valve seat to produce downward pressure and the balancing valve spool produces an upward force to balance the downward pressure, wherein the bottom portion of the piston sleeve bears the upward pressure. A user can set the desired outlet pressure by regulating the spring force through the regulating rod. The spring force allows the valve rod to move up and down and the valve seat moves up and down between the second area and the valve port. When the valve seat moves to the bottommost end, the opening of the valve port is at its maximum and the outlet pressure of the second area becomes smaller. As the valve seat moves up, the opening of the valve port becomes smaller and the outlet pressure of the second area becomes larger. The valve rod does not stop moving until the outlet pressure reaches a desired value, at which time the pressure regulating valve is in a balanced state.

In regards to the balancing valve spool, the force produced by the inlet pressure on the valve seat can be changed by changing the contact area of the bottom portion of the piston sleeve with the gas inlet pressure (or liquid inlet pressure). Likewise, the most suitable diaphragm size can be found by adjusting the size of the diaphragm to output the needed outlet pressure.

Although terms "first", "second", "third" and the like are used to describe various components, parts or portions, such components, parts or portions shall not be limited by such terms; and such terms can only be used for distinguishing a component, part or portion. When terms such as "first" and "second" and other numerical terms are used herein, it does not include sequence or order, unless otherwise clearly stated in the context. Therefore, under the situation of not departing from the illustration of the exemplary embodiments, the first component, part or portion below can be interpreted as a term "first element, part or portion".

The examples described above are just preferred examples of the present disclosure and should not be used for limiting the scope of the present disclosure. Any modification, equivalent replacement, improvement and the like made within the spirit of the present disclosure shall be included in the scope of the present disclosure.

The invention claimed is:

1. A balancing valve spool, wherein the balancing valve spool comprises:
   a valve rod having a first end and a second end, the valve rod defining a longitudinal axis extending between the first end and the second end;
   a piston sleeve fixed on the valve rod between the first end and the second end; and
   a fixing piece arranged between the valve rod and the piston sleeve, the fixing member extending in a direction parallel to the longitudinal axis of the valve rod,
   wherein the piston sleeve comprises a sleeve body and a bottom, the bottom of the piston sleeve is fixed on the valve rod and a first gap is arranged between an inner wall of the sleeve body of the piston sleeve and an outer wall of the valve rod.

2. The balancing valve spool according to claim 1, wherein a first sealing part is arranged between the fixing piece and the sleeve body of the piston sleeve.

3. A pressure regulating valve, comprising:
   a valve body provided with an inlet, an outlet, and a valve cavity in communication with the inlet and the outlet;
   a balancing valve spool, the balancing valve spool including:
      a valve rod;
      a piston sleeve fixed on the valve rod;
      a fixing piece arranged between the valve rod and the piston sleeve, the fixing piece extending in a direction parallel to an axis of the valve rod; and
      a valve seat fixed to the valve rod; and
   an actuator fixedly connected to the valve body, the actuator coupled to the valve rod to move the valve seat within the valve cavity to control fluid flow through the valve body, wherein the fixing piece is integrally formed with a portion of the actuator.

4. The pressure regulating valve according to claim 3, wherein the actuator comprises:
   a pressure regulating device;
   a diaphragm cap assembly comprising a first diaphragm cap and a second diaphragm cap, the first diaphragm cap being connected to the pressure regulating device, the second diaphragm cap being connected to the valve body and integrally molded to the fixing piece, and the first diaphragm cap mating with the second diaphragm cap to form a hollow internal portion; and
   a diaphragm assembly comprising a diaphragm, the diaphragm being located between the first diaphragm cap and the second diaphragm cap.

5. The pressure regulating valve according to claim 4, wherein the fixing piece is fixed on the second diaphragm cap.

6. The pressure regulating valve according to claim 4, further comprising a guide sleeve which is fixed to the second diaphragm cap, wherein the guide sleeve is a ring which surrounds a cross section of the valve rod.

7. The pressure regulating valve according to claim 3, further comprising a guide sleeve which is located on an outer circumference of the valve rod.

8. The pressure regulating valve according to claim 4, wherein the pressure regulating valve comprises at least two guide sleeves.

9. The pressure regulating valve according to claim 3, wherein a bottom of the piston sleeve comprises an extending portion that extends outwardly in a direction along the longitudinal axis of the valve rod, and the extension portion closely surrounds the valve rod.

10. The pressure regulating valve according to claim 3, wherein the valve rod and the piston sleeve are integrally molded.

11. The pressure regulating valve according to claim 3, wherein a sealing part is arranged at a junction between the valve rod and a bottom of the piston sleeve.

12. A pressure regulating valve, comprising:
   a valve body provided with an inlet, an outlet, and a valve cavity in communication with the inlet and the outlet;
   a balancing valve spool, the balancing valve spool including:
      a valve rod;
      a piston sleeve fixed on the valve rod;
      a fixing piece arranged between the valve rod and the piston sleeve, the fixing piece extending in a direction parallel to an axis of the valve rod; and
      a valve seat fixed to the valve rod; and
   an actuator fixedly connected to the valve body, the actuator coupled to the valve rod to move the valve seat within the valve cavity to control fluid flow through the valve body,
   wherein the valve rod and the piston sleeve are integrally molded.

13. The pressure regulating valve according to claim 12, wherein the fixing piece is fixedly connected onto the actuator.

14. The pressure regulating valve according to claim 12, wherein the actuator comprises:
   a pressure regulating device;
   a diaphragm cap assembly comprising a first diaphragm cap and a second diaphragm cap, the first diaphragm cap being connected to the pressure regulating device, the second diaphragm cap being connected to the valve body, and the first diaphragm cap mating with the second diaphragm cap to form a hollow internal portion; and
   a diaphragm assembly comprising a diaphragm, the diaphragm being located between the first diaphragm cap and the second diaphragm cap.

15. The pressure regulating valve according to claim 14, wherein the fixing piece is fixed on the second diaphragm cap.

16. The pressure regulating valve according to claim 14, further comprising a guide sleeve which is fixed to the second diaphragm cap, wherein the guide sleeve is a ring which surrounds a cross section of the valve rod.

17. The pressure regulating valve according to claim 12, further comprising a guide sleeve which is located on an outer circumference of the valve rod.

18. The pressure regulating valve according to claim 12, wherein the pressure regulating valve comprises at least two guide sleeves.

19. The pressure regulating valve according to claim 12, wherein a bottom of the piston sleeve comprises an extending portion that extends outwardly in a direction along the longitudinal axis of the valve rod, and the extension portion closely surrounds the valve rod.

20. The pressure regulating valve according to claim 12, wherein a sealing part is arranged at a junction between the valve rod and a bottom of the piston sleeve.

* * * * *

UNITED STATES PATENT AND TRADEMARK OFFICE
CERTIFICATE OF CORRECTION

PATENT NO. : 10,203,047 B2  
APPLICATION NO. : 15/328409  
DATED : February 12, 2019  
INVENTOR(S) : Biao Zhou Page 1 of 1

It is certified that error appears in the above-identified patent and that said Letters Patent is hereby corrected as shown below:

In the Specification

At Column 2, Line 59, "disclosure." should be -- disclosure; and --.

In the Claims

At Column 6, Line 13, "fixing member" should be -- fixing piece --.

Signed and Sealed this
Twenty-first Day of April, 2020

Andrei Iancu
*Director of the United States Patent and Trademark Office*